(12) United States Patent
Ravindran et al.

(10) Patent No.: US 11,640,613 B2
(45) Date of Patent: May 2, 2023

(54) MOTION-ENABLED TRANSACTION SYSTEM USING AIR SIGN SYMBOLS

(71) Applicant: American Express Travel Related Services Company, Inc., New York, NY (US)

(72) Inventors: Vinoth Ravindran, Peoria, AZ (US); Mukund Shankar Simharaghu, Glendale, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 76 days.

(21) Appl. No.: 17/157,603

(22) Filed: Jan. 25, 2021

(65) Prior Publication Data

US 2021/0142332 A1 May 13, 2021

Related U.S. Application Data

(63) Continuation of application No. 16/247,279, filed on Jan. 14, 2019, now Pat. No. 10,902,433.

(51) Int. Cl.
*G06Q 20/42* (2012.01)
*G06Q 20/32* (2012.01)
*G06F 3/01* (2006.01)

(52) U.S. Cl.
CPC ......... *G06Q 20/42* (2013.01); *G06Q 20/3224* (2013.01); *G06F 3/017* (2013.01)

(58) Field of Classification Search
CPC .............. G06Q 20/42; G06Q 20/3224; G06Q 20/4014; G06Q 20/4015; G06F 3/017; G06F 3/0346; G06F 3/04883
(Continued)

(56) References Cited

U.S. PATENT DOCUMENTS 8,515,991 B2 * 8/2013 Sato .................. G06F 16/40
707/916
9,641,222 B2 * 5/2017 Yang ................... H04W 4/80
(Continued)

FOREIGN PATENT DOCUMENTS

WO    WO 2011/066381 A2    6/2011

OTHER PUBLICATIONS

A 2D Barcode-Based Mobile Payment System; 2009 Third International Conference on Multimedia and Ubiquitous Engineering (pp. 320-329); Gao, J., Kulkarni, V., Ranavat, H.Lee Chang, Hsing Mei; Jun. 4, 2009. (Year: 2009).*
(Continued)

*Primary Examiner* — Tien C Nguyen
(74) *Attorney, Agent, or Firm* — Sterne, Kessler, Goldstein & Fox P.L.L.C.

(57) ABSTRACT

Systems and methods for motion-enabled transactions are disclosed. The system may allow users to complete transactions with merchants via an air sign input. The system may receive a motion-enabled transaction request comprising an air sign input. The system may determine a stored air sign symbol based on the air sign input. The system may retrieve a merchant identifier, a transaction type, and a transaction cost based on the determined stored air sign symbol. The system may transmit a transaction confirmation comprising the merchant identifier, the transaction type, and the transaction cost. In response to the user confirming the transaction confirmation, the system may authorize and process the transaction.

20 Claims, 6 Drawing Sheets

(58) Field of Classification Search
USPC ......... 705/44, 37, 38, 39; 709/227; 726/9, 6; 235/375, 380; 340/540; 706/25, 45
See application file for complete search history.

(56) References Cited

U.S. PATENT DOCUMENTS

| | | | |
|---|---|---|---|
| 10,181,020 B2 | 1/2019 | Mardikar et al. | |
| 10,395,128 B2* | 8/2019 | Van Os | H04N 5/23222 |
| 10,469,248 B2 | 11/2019 | Chalakudi et al. | |
| 10,607,210 B2* | 3/2020 | Bortolotto | G06Q 20/36 |
| 10,642,967 B2 | 5/2020 | Balaraman et al. | |
| 10,902,433 B2 | 1/2021 | Ravindran et al. | |
| 11,102,007 B2* | 8/2021 | Rule | G06Q 20/204 |
| 2006/0017692 A1* | 1/2006 | Wehrenberg | G06F 1/1694 700/302 |
| 2006/0161870 A1* | 7/2006 | Hotelling | G06F 3/0412 715/863 |
| 2011/0029913 A1* | 2/2011 | Boillot | G06F 3/0346 715/776 |
| 2012/0209749 A1* | 8/2012 | Hammad | G06Q 20/326 705/27.1 |
| 2015/0003607 A1* | 1/2015 | Choi | H04L 63/065 380/44 |
| 2015/0006385 A1 | 1/2015 | Shah | |
| 2015/0277681 A1 | 10/2015 | Isaacson et al. | |
| 2015/0348001 A1* | 12/2015 | Van Os | G06Q 20/227 705/44 |
| 2018/0075453 A1 | 3/2018 | Durvasula et al. | |
| 2019/0057379 A1 | 2/2019 | Chalakudi et al. | |
| 2019/0108542 A1 | 4/2019 | Durvasula et al. | |
| 2019/0116142 A1 | 4/2019 | Chalakudi et al. | |
| 2019/0164157 A1 | 5/2019 | Balaraman et al. | |
| 2019/0303920 A1 | 10/2019 | Balaraman et al. | |
| 2019/0303942 A1 | 10/2019 | Balaraman et al. | |
| 2019/0385215 A1 | 12/2019 | Ferenczi et al. | |
| 2020/0042960 A1 | 2/2020 | Cook et al. | |
| 2020/0042971 A1 | 2/2020 | Eby et al. | |
| 2020/0226613 A1 | 7/2020 | Ravindran et al. | |

OTHER PUBLICATIONS

MMPS: a versatile mobile-to-mobile payment system; International Conference on Mobile Business (ICMB'05) (pp. 400-405); Ashutosh Saxena, Manik Lal Das, Anurag Gupta; Jul. 11, 2005. (Year: 2005).*

A secure and reliable local payment system; VTC-2005-Fall. 2005 IEEE 62nd Vehicular Technology Conference, 2005. (vol. 4, pp. 2761-2765); G. Me, A. Schuster; Jan. 1, 2005. (Year: 2005).

Near-Field Communication: It Pays: Mobile payment systems explained and explored; IEEE Consumer Electronics Magazine (vol. 4, Issue: 2, pp. 49-53); William Lumpkins, Martin Joyce; Apr. 1, 2015. (Year: 2015).

International Search Report and Written Opinion dated Apr. 16, 2020, issued by the U.S. Patent and Trademark Office in International Application No. PCT/US2020/13459, filed Jan. 14, 2020.

Extended European Search Report directed to related European Patent Application No. 20741426.9, dated Aug. 5, 2022; 7 pages.

* cited by examiner

MOTION-ENABLED TRANSACTION SYSTEM USING AIR SIGN SYMBOLS

CROSS-REFERENCE TO RELATED APPLICATION

This application is a continuation of U.S. patent application Ser. No. 16/247,279, entitled "MOTION-ENABLED TRANSACTION SYSTEM USING AIR SIGN SYMBOLS," and filed on Jan. 14, 2019, which is incorporated herein by reference in its entirety.

FIELD

The disclosure generally relates to transactions with a merchant, and more specifically, to a motion-enabled transaction system.

BACKGROUND

Users may desire to initiate transactions with a merchant using various methods. For example, a user may initiate a transaction with a merchant in person (e.g., via a brick and mortar store), by telephone, or online (e.g., via a mobile application or merchant website). Users may initiate and complete transactions in person by interacting with the merchant's point of sale system such as, for example, by swiping, inserting, or tapping a transaction instrument. The user may also use near field communication (NFC) to communicate from a transaction instrument or use BLUETOOTH® with a mobile device linked to the transaction account. A technical problem is that NFC, BLUETOOTH®, and similar transaction channels may be unsecure, and may be susceptible to transaction data being intercepted or misused by a third-party.

SUMMARY

Systems, methods, and articles of manufacture (collectively, the "system") for motion-enabled transactions are disclosed. The system may receive a motion-enabled transaction request comprising an air sign input. The system may determine a stored air sign symbol based on the air sign input. The system may retrieve a merchant identifier, a transaction type, and a transaction cost based on the determined stored air sign symbol. The system may transmit a transaction confirmation comprising the merchant identifier, the transaction type, and the transaction cost.

In various embodiments, the system may preprocess the air sign input by filtering and/or normalizing the air sign input. The system may receive a second air sign input based on the transaction confirmation.

In various embodiments, the system may transmit a transaction authorization request to a payment network, wherein the transaction authorization request comprises a user identifier and the transaction cost, and wherein the payment network authorizes the transaction authorization request to approve the motion-enabled transaction request. The system may transmit a transaction approval notification to complete the motion-enabled transaction request. The air sign input may be generated by a user device, and wherein the user device may generate the air sign input based on accelerometer data, a touchscreen interface input, or a user selection of a button, a link, or an image. The air sign input may also be generated by a merchant device, and wherein the merchant device may generate the air sign input by capturing a user gesture.

In various embodiments, the motion-enabled transaction request may also comprise GPS location data. The merchant identifier may be determined based on the stored air sign symbol and the GPS location data.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

Figure 1:
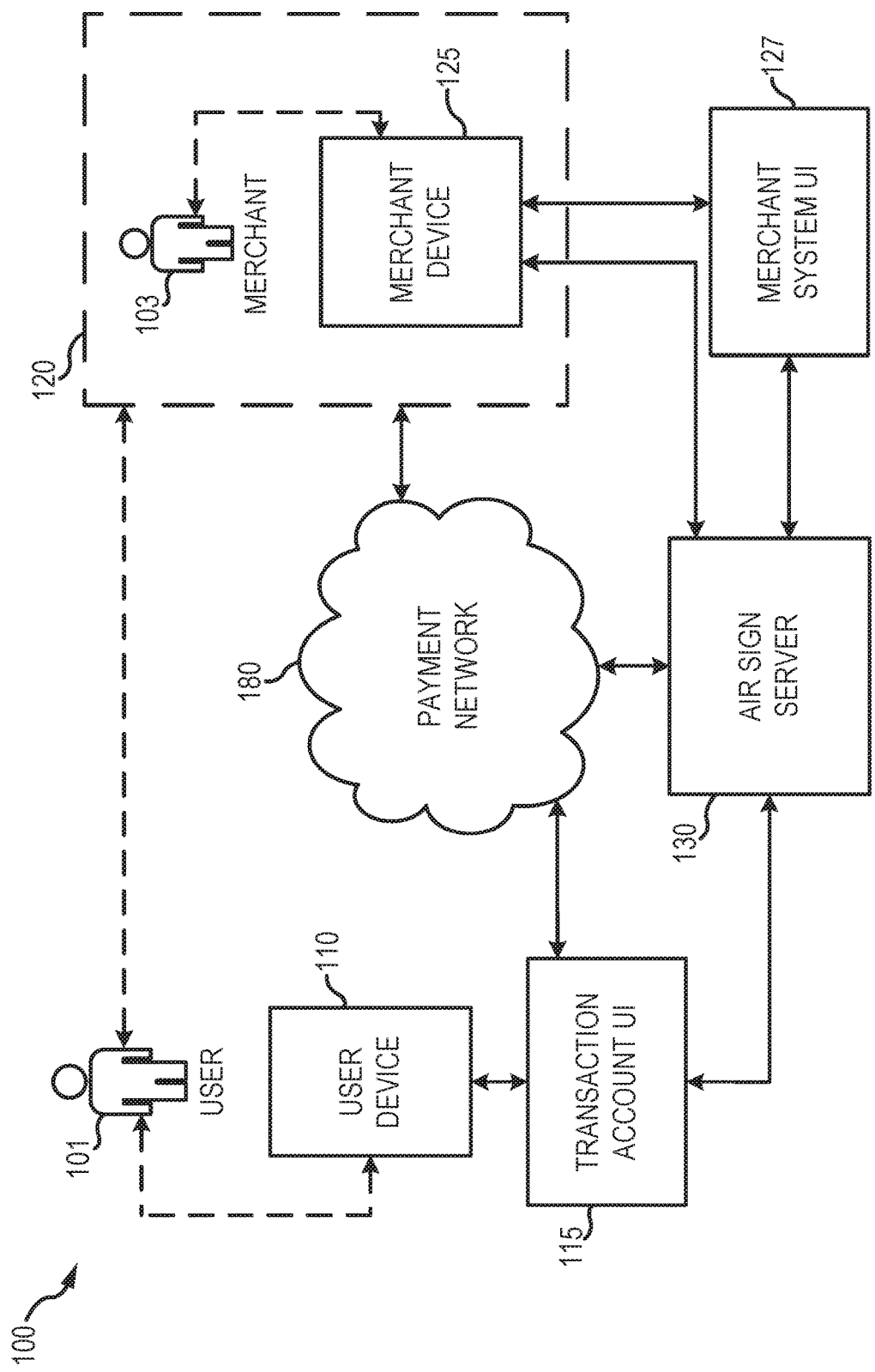
FIG. 1 is a block diagram illustrating various system components of a system for motion-enabled transactions between a user and a merchant, in accordance with various embodiments.

In various embodiments, systems and methods for motion-enabled transactions using air sign symbols are disclosed. The system may allow users (e.g., a transaction account user, holder, beneficiary, etc.) to initiate and complete motion-enabled transactions with a merchant. For example, the user may interact with the merchant at a brick and mortar store, or through part of an automated transaction system (e.g., kiosks, parking meters, parking garages, or the like). The user may initiate a transaction with the merchant by inputting an air sign input. The air sign symbol may be unique to the merchant, to the geographical location of the merchant, to the time period, to the season, to the consumer, etc. The air sign input may be a symbol, shape, or the like, and may be created through motion, gesture, or input from the user. For example, the air sign input may be a checkmark, a number (e.g., 1, 15, etc.), a letter (e.g., "a," "D," etc.), a shape (e.g., a circle, a square, etc.), a gesture (e.g., a handwave, a movement of the hand, etc.), and/or any other suitable symbol or shape created by motion or user gesture.

For more information about gesture-based systems and processes, see U.S. patent application Ser. No. 14/860,375 entitled "SYSTEMS AND METHODS FOR GESTURE BASED BIOMETRIC SECURITY," filed Sep. 21, 2015, and which is hereby incorporated by reference in its entirety for all purposes.

In various embodiments, the user may input the air sign input using an appendage (e.g., the user's hand, fingers, feet, etc.), an external object, or the like. In various embodiments, the user may input the air sign input using a user device. For example, the user device may comprise any component configured to capture motion, capture velocity and/or track movement of the user device (e.g., an accelerometer). In that regard, the user may move the user device to simulate the shape of a given air sign symbol, and the accelerometer may track and generate data regarding the movement of the user device. As a further example, the user may interact with a touchscreen interface of the user device to draw the shape of a given air sign symbol. As a further example, the user may interact with the user device by selecting a button, link, and/or the like on a user interface depicting the air sign symbol. In various embodiments, the merchant may capture the air sign input from the user. For example, the merchant may comprise a communications interface configured to capture input from the user such as, for example, a camera configured to capture a hand gesture from the user, a touchscreen interface configured to capture the user's touch input, and/or the like.

The air sign input may be transmitted by the merchant or the user's device to a back-end server to match the input with a stored air sign symbol (or data representing an air sign symbol) to determine details regarding the transaction, merchant, consumer, user and the product or service associated with the air sign symbol. The back-end server may confirm the purchase of the product or the service with the user, and may communicate with a payment network to authorize and process the transaction. The merchant and/or the user may receive the transaction authorization from the payment network or the back-end server.

Therefore, the system may allow the merchant to conduct transactions without needing a traditional point of sale system. In that respect, the system may provide a technical solution to the technical problems presented in typical point of sale transactions. Thus, by transmitting, storing, and accessing data using the processes described herein, the security of the data is improved, which decreases the risk of the computer, network, or data from being compromised. Moreover, the system at least partially reduces processing times and resources involved in managing typical user interactions without conversations.

In various embodiments, by enabling merchants to conduct transactions without needing a traditional point of sale system, the system may also provide merchants the ability to implement an on-demand store or marketplace based on customer's line of sight. For example, and in accordance with various embodiments, merchants may use a billboard, airplane banner, or the like to display one or more goods or services together with one or more air signs inputs. The customer may complete the air sign input, as discussed further herein, to purchase the displayed goods or services.

In various embodiments, and with reference to FIG. 1, a system 100 for motion-enabled transactions is disclosed (e.g., a motion-enabled transaction system). System 100 may allow motion-enabled transactions using air sign symbols between a user 101 (e.g., a transaction account user, holder, beneficiary, or the like) and a merchant 103. System 100 may comprise one or more of a user device 110, a transaction account user interface (UI) 115, a merchant environment 120, a merchant device 125, a merchant user interface (UI) 127, an air sign server 130, and/or a payment network 180. System 100 may also contemplate uses in association with web services, utility computing, pervasive and individualized computing, security and identity solutions, autonomic computing, cloud computing, commodity computing, mobility and wireless solutions, open source, biometrics, grid computing, and/or mesh computing.

In various embodiments, user 101 may desire to initiate a motion-enabled transaction with merchant 103. For example, user 101 may interact with merchant environment 120 to initiate and complete motion-enabled transactions. Merchant environment 120 may include one or more of merchant 103 and/or merchant device 125. For example, merchant environment 120 may represent a kiosk, a brick and mortar store, a parking garage checkout system, a parking meter, an internet of things (IoT) device, or the like, or may be a virtual platform configured to allow user 101 to initiate the motion-enabled transaction with merchant 103. In that respect, and as discussed further herein, user 101 may directly interact with merchant 103 (e.g., via a checkout clerk or the like), or may interact with merchant device 125 directly as part of an automated checkout system, a self-checkout system, or the like.

In various embodiments, user 101 may initiate a motion-enabled transaction using user device 110. User device 110 may comprise any suitable hardware, software, and/or database components capable of sending, receiving, and storing data. For example, user device 110 may comprise a personal computer, personal digital assistant, cellular phone, smartphone (e.g., IPHONE®, BLACKBERRY®, and/or the like), IoT device, and/or the like. User device 110 may comprise an operating system such as, for example, a WINDOWS® mobile operating system, an ANDROID® operating system, APPLE® IOS®, a BLACKBERRY® operating system, a LINUX® operating system, and the like. User device 110 may also comprise software components installed on user device 110 and configured to allow user 101, via user device 110, access to transaction account UI 115. For example, user device 110 may comprise a web browser (e.g., MICROSOFT INTERNET EXPLORER®, GOOGLE CHROME®, etc.), an application, a micro-app or mobile application, or the like, configured to allow user 101 to access and interact with transaction account UI 115.

User device 110 may be in electronic communication with transaction account UI 115. Transaction account UI 115 may comprise software, a mobile application, a web interface, or the like accessible from user device 110. For example, transaction account UI 115 may include a graphical user interface ("GUI"), software modules, logic engines, various databases, interfaces to systems and tools, and/or computer networks. Transaction account UI 115 may be in electronic communication with air sign server 130 and/or payment network 180. For example, transaction account UI 115 may allow user 101, via user device 110, to interact with payment network 180 to view various data associated with one or more transaction accounts (e.g., transaction account balances, pending or settled transactions, loyalty points, etc.), and/or the like. Transaction account UI 115 may allow user 101, via user device 110, to interact with air sign server 130 such as, for example, to initiate and complete motion-enabled transactions, as discussed further herein. Access to transaction account UI 115 may be controlled by the authorization of user credentials. For example, user 101 may access transaction account UI 115 by inputting user credentials (e.g., a username, password, biometric input, etc.), and in response to payment network 180 authenticating the user credentials (e.g., by comparing the input user credentials to stored user credentials).

In various embodiments, user device 110 may comprise various hardware, software, and/or database components configured to enable user device 110 to participate in system 100 and initiate and complete motion-enabled transactions. For example, user device 110 may be computer based, and may comprise a processor, a tangible non-transitory computer-readable memory, and/or a network interface, along with other suitable system software and hardware components. Instructions stored on the tangible non-transitory memory may allow user device 110 to perform various functions, as described herein. The processor may include any logic device such as one or more of a central processing unit (CPU), an accelerated processing unit (APU), a digital signal processor (DSP), a field programmable gate array (FPGA), an application specific integrated circuit (ASIC), or the like.

Figure 2A:
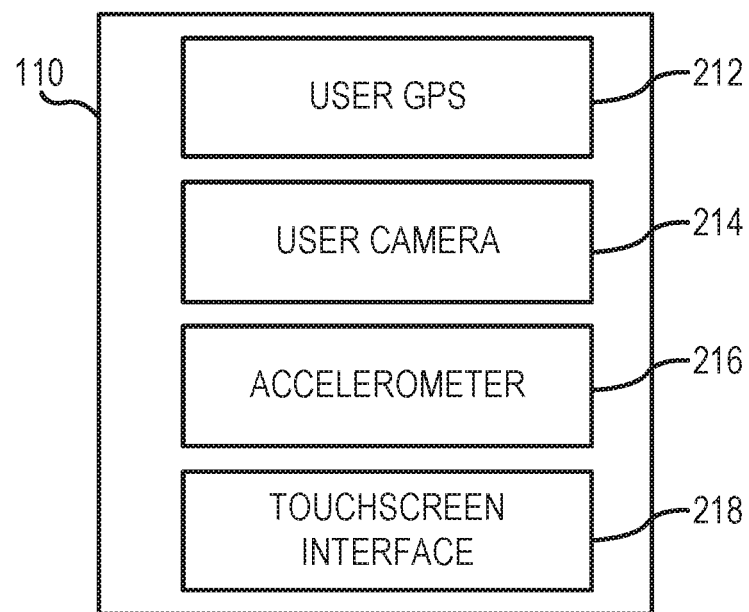
FIG. 2A is a block diagram illustrating various components of an exemplary user device for use in the system for motion-enabled transactions, in accordance with various embodiments.

As a further example, and with reference to FIG. 2A, user device 110 may comprise a user global positioning system (GPS) 212, a user camera 214, an accelerometer 216, and/or a touchscreen interface 218. User GPS 212 may be configured provide and capture location details of user device 110. For example, user GPS 212 may be configured to provide user GPS location data. User GPS 212 may comprise any suitable onboard location service or device and may comprise various hardware and/or software components. User camera 214 may comprise an onboard camera configured to take, capture, and store images and photos from user device 110. Images and photos captured by user camera 214 may be stored in memory internal or external to user device 110. User camera 214 may comprise any suitable type of camera and may comprise various hardware and/or software components. Touchscreen interface 218 may be configured to enable user 101 to interact with user device 110 via a touch input. For example, user 101 may interact with touchscreen interface 218 to draw shapes (e.g., to input an air sign symbol), to select buttons, links, or the like, and/or any other suitable interaction. Touchscreen interface 218 may comprise any suitable type of touchscreen and may comprise various hardware and/or software components.

In various embodiments, accelerometer 216 may be configured to capture motion, velocity, and movement of user device 110. Accelerometer 216 may comprise any suitable hardware and/or software components capable of capturing motion, velocity, and/or movement of user device 110.

In that regard, user 101 may move user device 110 to simulate the shape of a given air sign symbol, and accelerometer 216 may track and generate movement data regarding the movement of user device 110, as discussed further herein. Accelerometer 216 may be configured to passively or actively capture motion, velocity, and/or movement of user device 110. For example, and in accordance with various embodiments, in a passive capturing mode, accelerometer 216 may be configured to capture movement of user device 110 in response to user 101 input. As an example, user 101 may access transaction account UI 115 to input an air sign input. User 101 may select a button or link, or may give verbal instruction, to activate accelerometer 216 to capture movement of user device 110. In response to deselecting the button or link, accelerometer 216 may cease capturing movement of user device 110. As a further example, and in accordance with various embodiments, in an active capturing mode, accelerometer 216 may be configured to capture movement data of user device 110 without user 101 activation needed.

In various embodiments, and with reference again to FIG. 1, merchant device 125 may be configured to conduct motion-enabled transactions with user 101. Although the present disclosure makes reference to merchant device 125, it should be understood that principles of the present disclosure may be applied to a merchant environment 120 having any suitable number of merchant devices. Merchant device 125 may be in electronic communication with air sign server 130 and/or payment network 180. Merchant device 125 may comprise one or more hardware, software, and/or database components. For example, merchant device 125 may comprise one or more computing devices, such as, for example a computer or processor, or a set of computers and/or processors, although other types of computing units or systems may also be used. For example, and in accordance with various embodiments, merchant device 125 may comprise a personal computer, smartphone (e.g., IPHONE®, BLACKBERRY®, and/or the like), and/or the like. As a further example, and in accordance with various embodiments, merchant device 125 may comprise an Internet of Things (IoT) device such as, for example, a smart TV, or a similar IoT device having display capabilities. As a further example, and in accordance with various embodiments, merchant device 125 may comprise a kiosk, parking garage checkout system, parking meter, and/or the like. Merchant device 125 may comprise an operating system such as, for example, a WINDOWS® operating system, an ANDROID® operating system, APPLE® IOS®, a BLACKBERRY® operating system, a LINUX® operating system, and the like. Merchant device 125 may also comprise software components installed on merchant device 125 and configured to allow merchant 103, via merchant device 125, access to merchant system UI 127. For example, merchant device 125 may comprise a web browser (e.g., MICROSOFT INTERNET EXPLORER®, GOOGLE CHROME®, etc.), an application, a micro-app or mobile application, or the like, configured to allow merchant 103 to access and interact with merchant system UI 127.

Merchant device 125 may be in electronic communication with merchant system UI 127. Merchant system UI 127 may comprise software, a mobile application, a web interface, or the like accessible from merchant device 125. For example, merchant system UI 127 may include a graphical user interface ("GUI"), software modules, logic engines, various databases, interfaces to systems and tools, and/or computer networks. Merchant system UI 127 may be in electronic communication with air sign server 130 and/or payment network 180. For example, merchant system UI 127 may allow merchant 103, via merchant device 125, to interact with air sign server 130 such as, for example, to initiate and complete motion-enabled transactions, as discussed further herein. Access to merchant system UI 127 may be controlled by the authorization of merchant credentials. For example, merchant 103 may access merchant system UI 127 by inputting merchant credentials (e.g., a merchant ID, password, biometric input, etc.), and in response to payment network 180 authenticating the merchant credentials (e.g., by comparing the input merchant credentials to stored merchant credentials).

In various embodiments, merchant device 125 may comprise various hardware, software, and/or database components configured to enable merchant device 125 to participate in system 100 and complete motion-enabled transactions. For example, merchant device 125 may be computer based, and may comprise a processor, a tangible non-transitory computer-readable memory, and/or a network interface, along with other suitable system software and hardware components. Instructions stored on the tangible non-transitory memory may allow merchant device 125 to perform various functions, as described herein. The processor may include any logic device such as one or more of a central processing unit (CPU), an accelerated processing unit (APU), a digital signal processor (DSP), a field programmable gate array (FPGA), an application specific integrated circuit (ASIC), or the like.

Figure 2B:
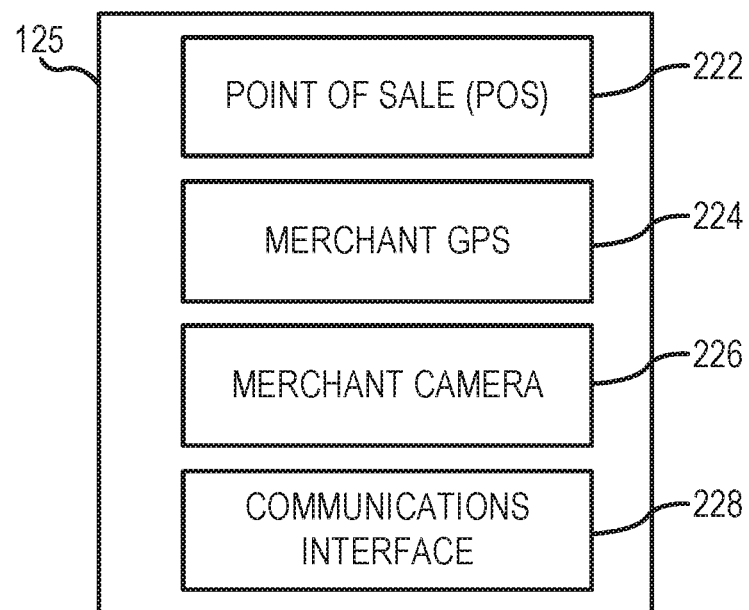
FIG. 2B is a block diagram illustrating various components of an exemplary merchant device for use in the system for motion-enabled transactions, in accordance with various embodiments.

As a further example, and with reference to FIG. 2B, merchant device 125 may comprise a point of sale (POS) 222, a merchant global positioning system (GPS) 224, a merchant camera 226, and/or a communications interface 228. In various embodiments, POS 222 may be configured as a mechanism to conduct typical transactions. In that respect, POS 222 may enable user 101 to initiate a transaction with merchant 103 using a transaction instrument, user device 110, or the like. POS 222 may comprise a cashier station, a credit or debit card reader, and/or the like. POS 222 may also comprise a near-field communication (NFC) terminal. In this regard, an NFC terminal may allow for the transfer of information to another NFC enabling device, such as, a mobile device.

Merchant GPS 224 may be configured provide and capture location details of merchant device 125. For example, merchant GPS 224 may be configured to provide merchant GPS location data. Merchant GPS 224 may comprise any suitable onboard location service or device and may comprise various hardware and/or software components. Merchant camera 226 may comprise an onboard camera configured to take, capture, and store images, photos, and video from merchant device 125. Images, photos, and video captured by merchant camera 226 may be stored in memory internal or external to merchant device 125. Merchant camera 226 may comprise any suitable type of camera and may comprise various hardware and/or software components. In various embodiments, merchant camera 226 may be configured to capture gestures from user 101 such as, for example, in response to user 101 gesturing to create an air sign input, as discussed further herein. In that respect, merchant camera 226, and/or merchant device 125, may comprise logic configured to identify the portion of user 101 making the gesture (e.g., a hand, arm, finger, etc.), and to capture the motion of the gesture.

In various embodiments, communications interface 228 may comprise various hardware and/or software components, and may comprise a display screen (e.g., touchscreen, LED display, LCD display, etc.). Communications interface 228 may be configured to display motion-enabled transaction data to user 101. For example, communications interface 228 may display available air signs for products and/or services to initiate a motion-enabled transaction (e.g., "to purchase a cheeseburger, complete the following air sign: 'CB'"). In that regard, user 101 may view or interact with communications interface 228 and may initiate the motion-enabled transaction by completing the displayed air sign input, as discussed further herein.

With reference again to FIG. 1, and in accordance with various embodiments, air sign server 130 may be configured to perform various operations for motion-enabled transactions such as, for example, user registration for motion-enabled transactions, merchant registration for motion-enabled transactions, and/or processing of motion-enabled transactions, as discussed further herein. Air sign server 130 may be in electronic communication with transaction account UI 115, merchant system UI 127, merchant device 125 and/or merchant environment 120, and/or payment network 180. Air sign server 130 may comprise any suitable combination of hardware, software, and/or database components, including, for example, a server, web server, pooled servers, or the like. Air sign server 130 may also include one or more data centers, cloud storages, network environments, or the like. In various embodiments, air sign server 130 may include one or more processors and/or one or more tangible, non-transitory memories and be capable of implementing logic. The processor may be configured to implement various logical operations in response to execution of instructions, for example, instructions stored on a non-transitory, tangible, computer-readable medium, as discussed further herein. The processor may include any logic device such as one or more of a central processing unit (CPU), an accelerated processing unit (APU), a digital signal processor (DSP), a field programmable gate array (FPGA), an application specific integrated circuit (ASIC), or the like.

Figure 3:
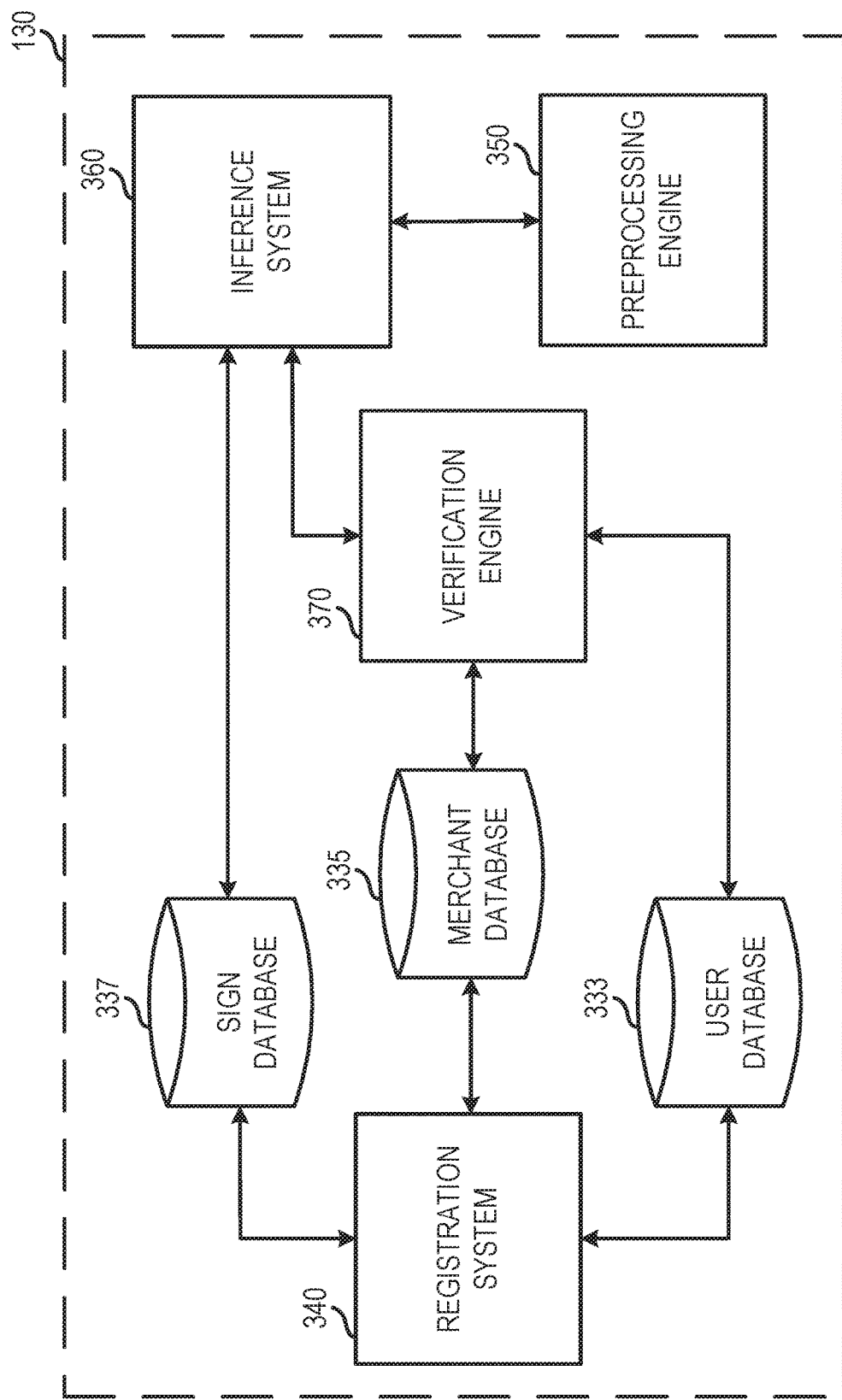
FIG. 3 is a block diagram illustrating various components of an exemplary air sign server for use in the system for motion-enabled transactions, in accordance with various embodiments.

In various embodiments, air sign server 130 may comprise various hardware, software, and/or database components configured to enable air sign server 130 to perform various operations for motion-enabled transactions. For example, and with reference to FIG. 3, air sign server 130 may comprise a registration system 340, a user database 333, a merchant database 335, a sign database 337, a preprocessing engine 350, an inference system 360, and/or a verification engine 370.

Registration system 340 may be configured to register user 101 and/or merchant 103 for motion-enabled transactions. For example, registration system 340 may receive user air sign registration requests from user device 110, via transaction account UI 115. The user air sign registration request may comprise a user identifier (e.g., username, transaction account number, etc.), a user photo (e.g., an uploaded photo, a photo taken using user camera 214, etc.), and/or any other user data. In various embodiments, the user air sign registration request may also comprise a biometric input (e.g., fingerprint, facial image, etc.) and/or an authentication air sign input. The authentication air sign input may be input or selected by the user, and may be configured as an identifier of the user during air sign transactions. As discussed further herein, the authentication air sign input, either alone or in combination with user biometric data, may enable merchant device 125 to identify the user to complete the transaction. In various embodiments, the user air sign registration request may also comprise data granting transaction account UI 115 access to various components of user device 110 (e.g., user GPS 212, user camera 214, accelerometer 216, and/or touchscreen interface 218). User database 333 may be configured to store and maintain the user air sign registration data. User database 333 may store the user air sign registration data grouped by the user identifier. User database 333 may comprise any suitable database, data structure, table, or the like capable of storing data. User database 333 may store the data using any suitable technique.

As a further example, registration system 340 may receive merchant air sign registration requests from merchant device 125, via merchant system UI 127. The merchant air sign registration request may comprise a merchant identifier (e.g., merchant ID, merchant name, etc.), and/or any other merchant data. In various embodiments, the merchant air sign registration request may also comprise data granting merchant system UI 127 access to various components of merchant device 125 such as, for example, POS 222, merchant GPS 224, merchant camera 226, and/or communications interface 228. Merchant database 335 may be configured to store and maintain the merchant air sign registration data. Merchant database 335 may store the merchant air sign registration data grouped by the merchant identifier. Merchant database 335 may comprise any suitable database, data structure, table, or the like capable of storing data. Merchant database 335 may store the data using any suitable technique.

Registration system 340 may also be configured to interact with merchant 103 to register one or more products or services for motion-enabled transactions. For example, registration system 340 may receive a motion-enabled transaction registration request from merchant device 125, via merchant system UI 127. The motion-enabled transaction registration request may comprise data indicating the product, service, or the like that merchant 103 desires to be available for motion-enabled transactions. For example, the motion-enabled transaction registration request may comprise a product or service name, a product or service identifier (e.g., product SKU, UPC, etc.), a product or service price, and/or any other suitable or desired product or service data. As a further example, and in accordance with various embodiments, the motion-enabled transaction registration request may comprise transaction availability data, such as an available day (e.g., Monday only, Monday-Friday, weekends, etc.), an available time (e.g., 8:00 am-10:00 am, 3:00 pm-5:00 pm, etc.), an expiration date, or the like. As a further example, and in accordance with various embodiments, the motion-enabled transaction registration request may also comprise merchant GPS location data. The merchant GPS location data may define the geographical area that the motion-enabled transaction is available (e.g., the geographical location of the brick and mortar store, a parking lot, a parking garage, etc.). Merchant 103, via merchant device 125, may manually input and specify the merchant GPS location data such as, for example, by inputting location data or by interacting with a map via merchant system UI 127. The merchant GPS location data may also be based on data retrieved from merchant GPS 224 indicating the present position of merchant device 125. The merchant GPS location data may also comprise a geofence defining a virtual geographic boundary based on the data retrieved from merchant GPS 224.

In various embodiments, sign database 337 may be configured to store and maintain air sign symbols (e.g., stored air sign symbols) for use in system 100. Each air sign symbol may be associated with air sign availability data such as, for example, a status (e.g., active, inactive, etc.), merchant use data (e.g., GPS location data of other merchants using a given air sign symbol), and/or any other availability data. In various embodiments, sign database 337 may also be configured to store and maintain air sign symbols for user identification. For example, during user air sign registration, a user may input or select an air sign symbol to be used as an identifier for the user during transactions (e.g., an authentication air sign input). The authentication air sign input may be stored and associated with a user identifier (e.g., user ID, user transaction account identifier, etc.). As discussed further herein, the authentication air sign input, either alone or in combination with user biometric data, may enable merchant device 125 to identify the user to complete the transaction.

Sign database 337 may store the air sign symbol data grouped by an air sign symbol ID or similar identifier. For example, and in accordance with various embodiments, the air sign symbol ID may correspond to a machine learning model that may be used by inference system 260 during the transaction process to determine the air sign input by the user. Sign database 337 may comprise any suitable database, data structure, table, or the like capable of storing data. Sign database 337 may store the data using any suitable techniques.

In various embodiments, preprocessing engine 350 may be configured to receive and preprocess air sign inputs. For example, preprocessing engine 350 may preprocess the air sign inputs by filtering, sampling, and/or normalizing the data. In various embodiments, the air sign input may be normalized to remove irrelevant data from the air sign input. For example, users may input the air sign input in a given three-dimensional space, using a combination of three axis (e.g., X, Y, Z). Preprocessing engine 250 may normal the air sign input by converting the three-axis data to two axis data, such as, for example, by calculating the angle of motion and normalizing the data to a two-dimensional plane. In various embodiments, the air sign input may be filtered by truncating data captured before and/or after the symbol from the air sign input (e.g., in response to capturing accelerometer data to generate the air sign input, movement may be captured before and/or after the symbol is simulated). In various embodiments, the air sign input may be sampled by removing redundant data points in close proximity to each other.

In various embodiments, inference system 360 may be configured to receive the air sign input (or the preprocessed air sign input from preprocessing engine 350) and identify a stored air sign symbol corresponding to the air sign input. For example, and in accordance with various embodiments, inference system 360 may comprise a neural network having pre-trained models configured to classify air sign inputs. The neural network may comprise an artificial neural network (ANN) used to perform various machine learning and artificial intelligence operations, tasks, and processing. The neural network may comprise a plurality of computing nodes configured to individually and/or collective perform processing. Each local node may comprise a computing model configured to control processing in the local node. As each node operates over time, model update events (e.g., prediction errors, new model requirements, etc.) may be observed. Each node may update the computing model locally and/or globally based on the new processed data and discovered model update event. Inference system 360 may interact with sign database 337 to retrieve stored air sign symbol data to aid in identifying the air sign input. In various embodiments, inference system 260 may also implement, or integrate with, various software solutions and tools, such as, for example MATLAB® developed by Mathworks, Inc., TENSORFLOW®, TENSORRT developed by NVIDIA®, and/or any other suitable software solution or tool.

In various embodiments, verification engine 370 may be configured to verify user 101 identity in motion-enabled transactions. For example, in response to receiving a motion-enabled transaction request, verification engine 370 may query user database 333 based on the user identifier from the motion-enabled transaction request. Verification engine 370 may verify user 101 identity by verifying that data corresponding to the user identifier exists in user database 333. Verification engine 370 may also retrieve data corresponding to the identifier user 101 such as, for example, the user photo, the user name, or the like. Verification engine 370 may also be configured to determine merchant data corresponding to the air sign input (e.g., based on the inference completed by inference system 360). For example, verification engine 370 may query merchant database 335 based on the identified air sign symbol and the GPS location data from the motion-enabled transaction request to locate merchant data. Verification engine 370 may retrieve the merchant data corresponding to the matched stored air sign symbol such as, for example, product or service details (e.g., name, description, etc.), product or service price, and/or the like. Verification engine 370 may communicate with user 101 to confirm the product or service details and to proceed with the transaction, as discussed further herein.

In various embodiments, and with reference again to FIG. 1, payment network 180 may be configured to receive motion-enabled transaction data from air sign server 130, authorize the transactions, process and settle the transaction, and the like, as discussed further herein, Payment network 180 may be in electronic communication with transaction account UI 115, merchant environment 120, and/or air sign server 130. Payment network 180 may comprise any suitable combination of hardware, software, and/or database components. For example, payment network 180 may comprise one or more network environments, servers, computer-based systems, processors, databases, and/or the like. Payment network 180 may comprise at least one computing device in the form of a computer or processor, or a set of computers/processors, although other types of computing units or systems may be used such as, for example, a server, web server, pooled servers, or the like. Payment network 180 may also include one or more data centers, cloud storages, or the like, and may include software, such as APIs, configured to perform various operations discussed herein. In various embodiments, payment network 180 may include one or more processors and/or one or more tangible, non-transitory memories and be capable of implementing logic. The processor may be configured to implement various logical operations in response to execution of instructions, for example, instructions stored on a non-transitory, tangible, computer-readable medium, as discussed further herein.

In various embodiments, payment network 180 may comprise or interact with a traditional payment network or transaction network to facilitate transactions, purchases, and payments, authorize transactions, settle transactions, and the like. For example, payment network 180 may represent existing proprietary networks that presently accommodate transactions for credit cards, debit cards, and/or other types of transaction accounts or transaction instruments. Payment network 180 may be a closed network that is secure from eavesdroppers. In various embodiments, payment network 180 may comprise an exemplary transaction network such as AMERICAN EXPRESS®, VISANET®, MASTERCARD®, DISCOVER®, INTERAC®, Cartes Bancaires, JCB®, private networks (e.g., department store networks), and/or any other payment network, transaction network, or the like. Payment network 180 may include systems and databases related to financial and/or transactional systems and processes such as, for example, one or more authorization engines, authentication engines and databases, settlement engines and databases, accounts receivable systems and databases, accounts payable systems and databases, and/or the like. In various embodiments, payment network 180 may also comprise a transaction account issuer's Credit Authorization System ("CAS") capable of authorizing transactions, as discussed further herein. Although the present disclosure makes reference to payment network 180, it should be understood that principles of the present disclosure may be applied to a system for motion-enabled transactions having any suitable number of payment networks. For example, system 100 may comprise one or more payment networks 180 each corresponding to or associated with a different issuer system or network.

Figure 4:
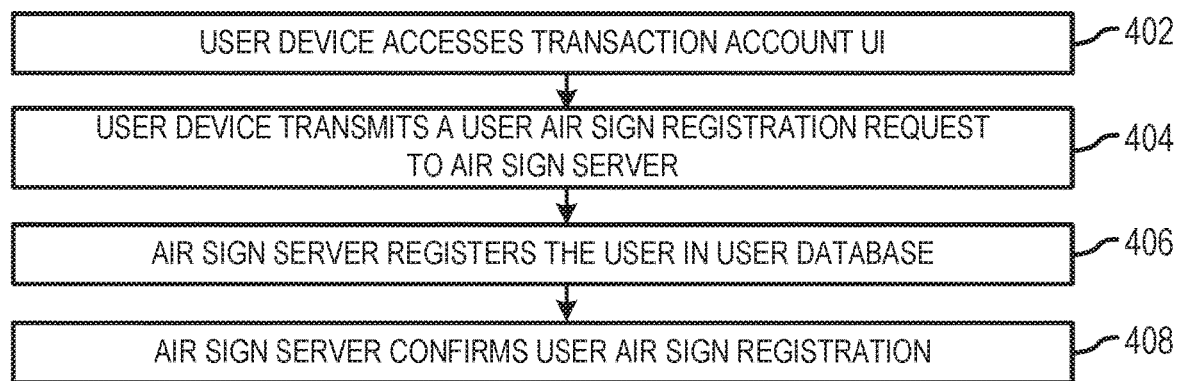
FIG. 4 illustrates a process flow for a method of user registration for motion-enabled transactions, in accordance with various embodiments.
Figure 5:
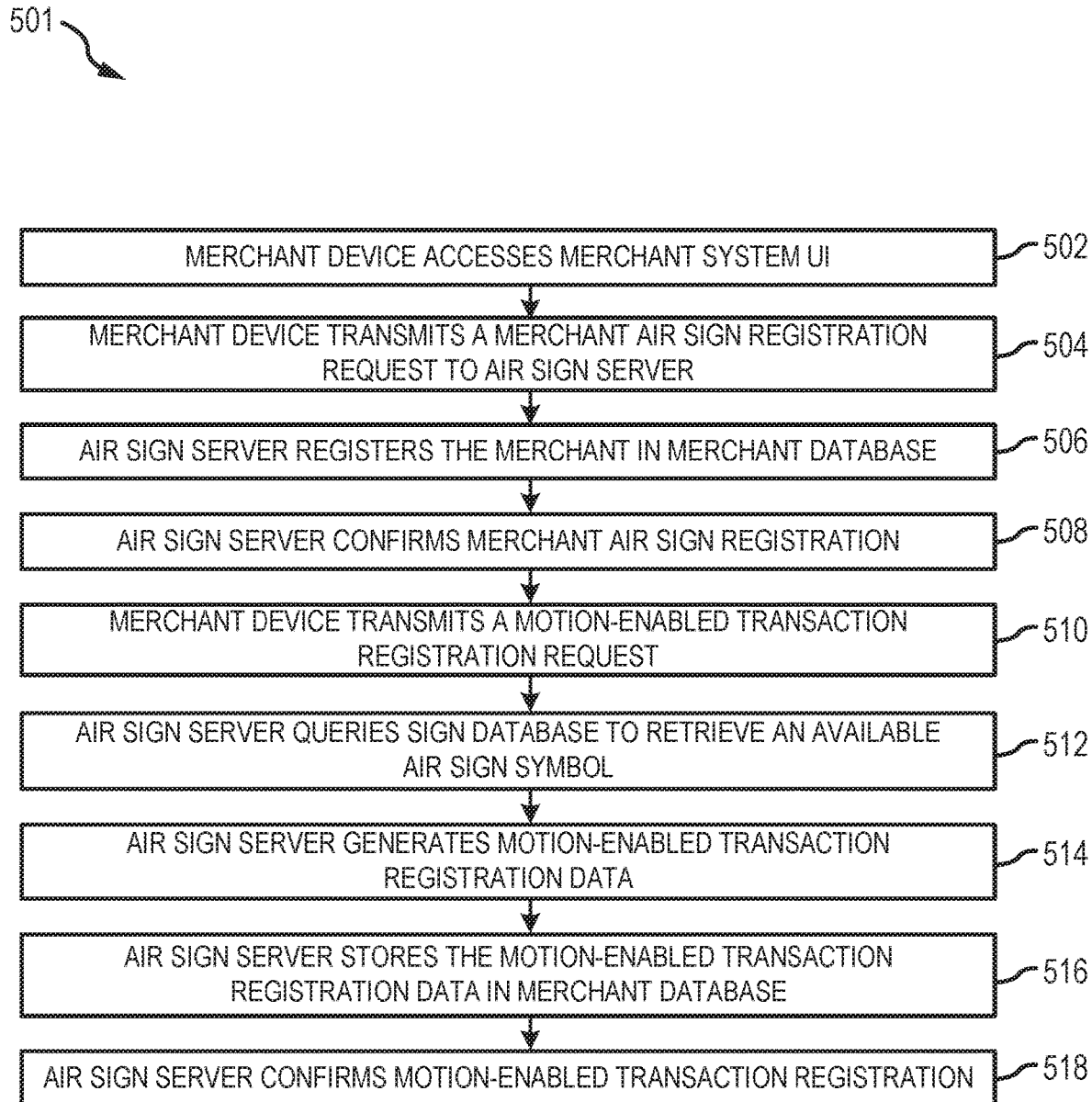
FIG. 5 illustrates a process flow for a method of merchant registration for motion-enabled transactions, in accordance with various embodiments.
Figure 6:
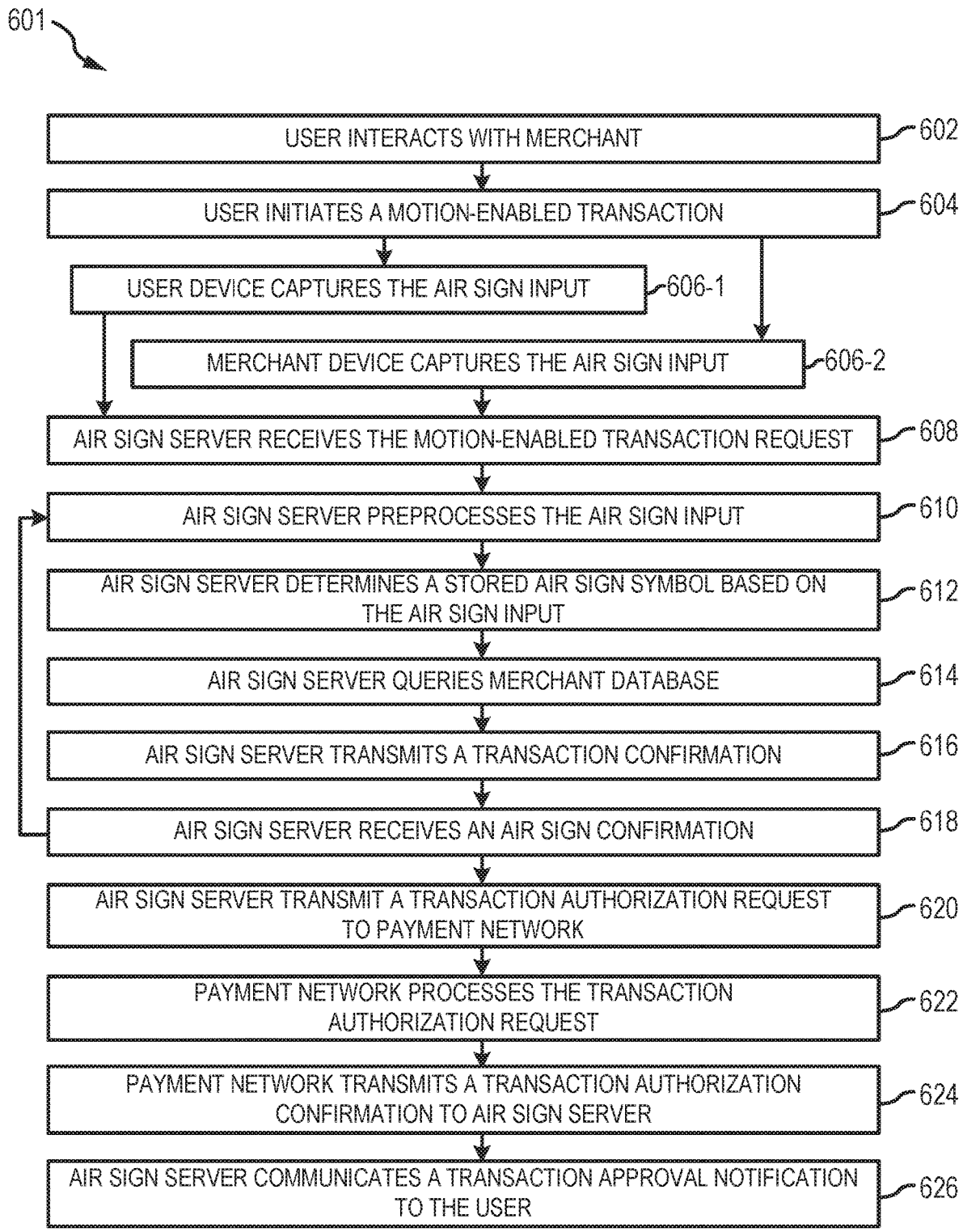
FIG. 6 illustrates a process flow for a method for motion-enabled transactions using air sign symbols, in accordance with various embodiments.

Referring now to FIGS. 4-6 the process flows depicted are merely embodiments and are not intended to limit the scope of the disclosure. For example, the steps recited in any of the method or process descriptions may be executed in any order and are not limited to the order presented. It will be appreciated that the following description makes appropriate references not only to the steps and user interface elements depicted in FIGS. 4-6, but also to the various system components as described above with reference to FIGS. 1-3. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below. Unless otherwise specifically noted, articles depicted in the drawings are not necessarily drawn to scale.

In various embodiments, and with reference to FIG. 4, a method 401 of user registration for motion-enabled transactions is disclosed. User device 110 accesses transaction account UI 115 (step 402). For example, user 101 may access transaction account UI 115, via user device 110, by inputting user credentials (e.g., a username, password, biometric input, etc.). Transaction account UI 115 may communicate with payment network 180 to verify and authenticate the user credentials (e.g., by comparing the input user credentials to stored user credentials). User 101 may access transaction account UI 115 to view transaction account data (e.g., transaction account balances, pending or settled transactions, loyalty points, etc.), to register for motion-enabled transactions, and/or to complete motion-enabled transactions, as discussed further herein.

User device 110 transmits a user air sign registration request to air sign server 130 (step 404), via transaction account UI 115. The user air sign registration request may comprise a user identifier (e.g., username, transaction account number, etc.), a user photo (e.g., an uploaded photo, a photo taken using user camera 214, etc.), and/or any other user data. In various embodiments, the user air sign registration request may also comprise data granting transaction account UI 115 access to various components of user device 110 such as, for example, user GPS 212, user camera 214, accelerometer 216, and/or touchscreen interface 218.

In response to receiving the user air sign registration request, air sign server 130, via registration system 340, registers user 101 in user database 333 (step 406). For example, air sign server 130 may write to user database 333 the user air sign registration request, and may group the write based on the user identifier. In response to successfully registering user 101, air sign server 130, via registration system 340, confirms user air sign registration (step 408) with user 101. The confirmation may comprise a visual notification in transaction account UI 115; a push notification, email, SMS, MMS, or the like transmitted to user device 110; and/or any other suitable notification method. In response to completing registration, transaction account UI 115 may display to user 101 an option to complete motion-enabled transactions, as discussed further herein (e.g., "Pay with Air Sign").

In various embodiments, and with reference to FIG. 5, a method 501 of merchant registration for motion-enabled transactions is disclosed. Merchant device 125 accesses merchant system UI 127 (step 502). For example, merchant 103 may access merchant system UI 127, via merchant device 125, by inputting merchant credentials (e.g., a merchant ID, password, biometric input, etc.). Merchant system UI 127 may communicate with payment network 180 to verify and authenticate the merchant credentials (e.g., by comparing the input merchant credentials to stored merchant credentials). Merchant 103 may access merchant system UI 127 to register for motion-enabled transactions, to complete motion-enabled transactions, and/or the like, as discussed further herein.

Merchant device 125 transmits a merchant air sign registration request to air sign server 130 (step 504), via merchant system UI 127. The merchant air sign registration request may comprise a merchant identifier (e.g., merchant ID, merchant name, etc.), and/or any other merchant data. In various embodiments, the merchant air sign registration request may also comprise data granting merchant system UI 127 access to various components of merchant device 125 such as, for example, POS 222, merchant GPS 224, merchant camera 226, and/or communications interface 228. In response to receiving the merchant air sign registration request, air sign server 130, via registration system 340, registers merchant 103 in merchant database 335 (step 506). For example, air sign server 130 may write to merchant database 335 the merchant air sign registration request, and may group the write based on the merchant identifier.

In response to completing the write, air sign server 130, via registration system 340, confirms merchant air sign registration (step 508) with merchant 103. The confirmation may comprise a visual notification in merchant system UI 127; a push notification, email, SMS, MMS, or the like transmitted to merchant device 125; and/or any other suitable notification method. In response to completing registration, transaction account UI 115 may display to user 101 an option to complete motion-enabled transactions, as discussed further herein (e.g., "Pay with Air Sign"). In response to completing registration, merchant 103 may interact with merchant system UI 127, via merchant device 125, to establish products, services, or the like to be made available for motion-enabled transactions.

In various embodiments, merchant device 125 transmits a motion-enabled transaction registration request (step 510) to air sign server 130, via merchant system UI 127. The motion-enabled transaction registration request may comprise data indicating the product, service, or the like that merchant 103 desires to be available for motion-enabled transactions. For example, the motion-enabled transaction registration request may comprise a transaction type (e.g., product, service, type of product, type of service, etc.), a product or service name, a product or service identifier (e.g., product SKU, UPC, etc.), a product or service price, and/or any other suitable or desired product or service data. As a further example, and in accordance with various embodiments, the motion-enabled transaction registration request may comprise transaction availability data, such as an available day (e.g., Monday only, Monday-Friday, weekends, etc.), an available time (e.g., 8:00 am-10:00 am, 3:00 pm-5:00 pm, etc.), an expiration date, or the like. As a further example, and in accordance with various embodiments, the motion-enabled transaction registration request may also comprise merchant GPS location data. The merchant GPS location data may define the geographical area that the motion-enabled transaction is available (e.g., the geographical location of the brick and mortar store, a parking lot, a parking garage, etc.). Merchant 103, via merchant device 125, may manually input and specify the merchant GPS location data such as, for example, by inputting location data or by interacting with a map via merchant system UI 127. The merchant GPS location data may also be based on data retrieved from merchant GPS 224 indicating the present position of merchant device 125. The merchant GPS location data may also comprise a geofence defining a virtual geographic boundary based on the data retrieved from merchant GPS 224. As a further example, and in accordance with various embodiments, the motion-enabled transaction registration request may also comprise a specified air sign symbol. For example, merchant 103 may input or select one or more desired specified air sign symbols to correspond to the product or service defined in the motion-enabled transaction registration request.

In response to receiving the motion-enabled transaction registration request, air sign server 130, via registration system 340, queries sign database 337 to retrieve an available air sign symbol (step 512). For example, sign database 337 may store and maintain air sign symbols for use in system 100. Each air sign symbol may be associated with air sign availability data such as, for example, a status (e.g., active, inactive, etc.), merchant use data (e.g., GPS location data of other merchants using a given air sign symbol), and/or any other availability data. Air sign server 130, via registration system 340, may query sign database 337 to locate all air sign symbols having an "active" status. Based on the available air sign symbols, air sign server 130, via registration system 340, may review the associated merchant use data to determine an available air sign symbol having merchant use data that does not at least partially overlap the merchant GPS location data (e.g., the available air sign symbol is not being used in the same geographic location as another merchant). In various embodiments, based on the query, air sign server 130, via registration system 340, may randomly select from the retrieved available air sign symbols.

In response to selecting an available air sign symbol, air sign server 130, via registration system 340, generates motion-enabled transaction registration data (step 514). The motion-enabled transaction registration data may comprise the motion-enabled transaction registration request and the available air sign symbol. In response to generating the motion enabled transaction registration data, air sign server 130, via registration system 340, may update the merchant use data of the available air sign symbol data in sign database 337 to comprise the merchant GPS location data. Air sign server 130, via registration system 340, stores the motion-enabled transaction registration data in merchant database 335 (step 516). Air sign server 130 may store the motion-enabled transaction registration data by updating the stored merchant data associated with the merchant identifier. In that respect, merchant 103 may initiate a registration for multiple products and/or services, and the motion-enabled transaction registration data for each product and/or service may be stored in merchant database 335 grouped by the merchant identifier.

In response to storing the motion-enabled transaction registration data, air sign server 130, via registration system 340, confirms motion-enabled transaction registration (step 518) with merchant 103. The confirmation may comprise a visual notification in merchant system UI 127; a push notification, email, SMS, MMS, or the like transmitted to merchant device 125; and/or any other suitable notification method.

In various embodiments, and with reference to FIG. 6, a method 601 for motion-enabled transactions is disclosed. User 101 interacts with merchant 103 (step 602). For example, user 101 may interact with merchant 103 by visiting a brick and mortar store, by interacting with a touchscreen or display available in merchant environment 120 (e.g., communications interface 228 of merchant device 225), and/or the like. The interaction may be part of an automated checkout process, a self-checkout process, or may comprise a verbal interaction directly with merchant 103. For example, user 101 may view communications interface 228 of merchant device 125 to determine products or services offered for motion-enabled transactions (which may be all products or a subset of products). User 101 initiates a motion-enabled transaction (step 604) with merchant 103. User 101 may initiate the motion-enabled transaction by generating an air sign input. The air sign input may correspond to an air sign symbol displayed on communications interface 228 of merchant device 125 and may be unique to merchant 103, the product or service, and/or the geographical location of the merchant. The air sign input may be a symbol, shape, or the like, and may be created through motion or input from user 101. For example, the air sign input may be a checkmark, a number (e.g., 1, 15, etc.), a letter (e.g., "a," "D," etc.), a shape (e.g., a circle, a square, etc.), and/or any other suitable symbol or shape created by motion or user gesture.

In various embodiments, user 101 may generate the air sign input by interacting with transaction account UI 115, via user device 110. For example, user 101 may interact with transaction account UI 115 to use accelerometer 216 to capture the air sign input. In that respect, user 101 may physically move user device 110 to simulate the shape of the displayed air sign symbol. User device 110, via accelerometer 216, may capture the motion and velocity of the movement to capture the air sign input. As a further example, user 101 may interact with transaction account UI 115 to draw the air sign input via touchscreen interface 218. In that regard, user 101 may touch touchscreen interface 218 using an appendage (e.g., finger) or apparatus (e.g., stylus) to draw the displayed air sign symbol. User device 110, via touchscreen interface 218, may capture the drawing to generate the air sign input. As a further example, transaction account UI 115 may display a button, link, image, or the like corresponding to the displayed air sign symbol (e.g., based on the location data from user GPS 212), and user 101 may generate the air sign input by selecting the button, link, image, or the like.

In response to user 101 interacting with transaction account UI 115, via user device 110, via transaction account UI 115, captures the air sign input (step 606-1) and generates a motion-enabled transaction request. The motion-enabled transaction request may comprise the air sign input, the user identifier, user GPS location data (e.g., from user GPS 212), and/or the like. Transaction account UI 115 may transmit the motion-enabled transaction request to air sign server 130.

In various embodiments, user 101 may generate the air sign input by interacting with merchant device 125. For example, user 101 may interact with merchant camera 226 of merchant device 125 to generate the air sign input. Merchant camera 226 may be configured to capture gestures performed by user 101. In that regard, user 101 may perform a gesture simulating the displayed air sign symbol using an appendage (e.g., finger, hand, etc.), apparatus, or the like. As a further example, user 101 may interact with communications interface 228 (e.g., a touchscreen) of merchant device 125 to generate the air sign input. User 101 may interface with communications interface 228 using an appendage (e.g., finger) or apparatus (e.g., stylus) to draw the displayed air sign symbol. Merchant device 125, via communications interface 228, may capture the drawing to generate the air sign input.

In response to user 101 interacting with merchant device 125, merchant device 125 captures the air sign input (step 606-2) and generates a motion-enabled transaction request. The motion-enabled transaction request may comprise the air sign input, the user identifier, merchant GPS location data (e.g., from merchant GPS 224), and/or the like. In various embodiments, merchant device 125 may capture a series of inputs from user 101. For example, user 101 may perform an initial gesture to notify merchant device 125 to begin capturing an air sign input. In response to detecting the initial gesture, merchant device 125 may prompt user 101 to perform an authentication air sign input. The authentication air sign input may comprise a user-defined input that is associated with the user's transaction account. Merchant device 125 may capture the authentication air sign input and/or a biometric input from the user (e.g., an image of the user's face, a fingerprint input, etc.). In that respect, the authentication air sign input, either alone or in combination with the user's biometric data, may enable merchant device 125 to identify the user to complete the transaction. In response to user 101 inputting the authentication air sign input, merchant device 125 may prompt user 101 to enter the air sign input corresponding to the transaction. In that regard, and in accordance with various embodiments, the motion-enabled transaction request may also comprise the authentication air sign input, user biometric data, and/or the like. Merchant device 125 transmits the motion-enabled transaction request to air sign server 130.

Air sign server 130 receives the motion-enabled transaction request (step 608) from user device 110 (e.g., as described in step 606-1) or merchant device 125 (e.g., as described in step 606-2). Air sign server 130, via preprocessing engine 350 may parse the motion-enabled transaction request to determine the air sign input. Air sign server 130, via preprocessing engine 350, preprocesses the air sign input (step 610) from the motion-enabled transaction request. For example, preprocessing engine 350 may preprocess the air sign input to filter, normalize, and/or sample the air sign input, as discussed further herein. In response to completing preprocessing of the air sign input, preprocessing engine 350 may transmit the air sign input to inference system 360.

In various embodiments, air sign server 130, via inference system 360, determines a stored air sign symbol based on the air sign input (step 612). Inference system 360 may determine the stored air sign symbol using any suitable method. For example, and in accordance with various embodiments, inference system 360 may process the air sign input in a trained neural network model configured to identify stored air sign symbols (e.g., stored in sign database 337). In response to determining the stored air sign symbol, inference system 360 may transmit data regarding the determined stored air sign symbol to verification engine 370.

In various embodiments, in response to receiving the authentication air sign input air sign server 130, via inference system 360, may also determine a stored air sign symbol based on the authentication air sign input (e.g., to determine the identity of the user). Inference system 360 may determine the stored air sign symbol using any suitable method. For example, and in accordance with various embodiments, inference system 360 may process the authentication air sign input in a trained neural network model configured to identify stored air sign symbols (e.g., stored in sign database 337). In response to determining the stored air sign symbol matching the authentication air sign input, air sign server 130 may retrieve data corresponding to the user based on the stored air sign symbol and/or the user biometric data. For example, air sign server 130 may retrieve the user identifier, user transaction account, and/or the like.

In various embodiments, air sign server 130, via verification engine 370, queries merchant database 335 (step 614)

to determine the merchant 103 using the determined stored air sign symbol. For example, verification engine 370 may query merchant database 335 based on the determined air sign symbol and the user GPS location data to locate the data associated with the stored air sign symbol and the merchant GPS location data matching the user GPS location data. For example, verification engine 370 may retrieve data regarding the product or service associated with the stored air sign symbol such as, for example, the merchant identifier, a transaction type (e.g., product, service, a description of the product or service, etc.), a transaction cost (e.g., the price of the product, the hourly rate of a service, etc.), and/or the like.

In response to retrieving the data associated with the stored air sign symbol, air sign server 130, via verification engine 370, transmits a transaction confirmation (step 616). The transaction confirmation may comprise the merchant identifier, the transaction type, and the transaction cost. In various embodiments, the transaction confirmation may also comprise user data such as, for example, the user name, the user photo, or the like. The transaction confirmation may comprise a confirmation air sign prompt (e.g., "input air sign checkmark to confirm the transaction"). In various embodiments, the transaction confirmation may also comprise a second air sign prompt. For example, in response to the stored air sign symbol requiring a follow up prompt, verification engine 370 may prompt user 101 with the second air sign prompt (e.g., "input air sign X for a small coffee, air sign Y for a medium coffee, or air sign Z for a large coffee," etc.). Verification engine 370 may transmit the transaction confirmation to user device 110 and/or merchant device 125.

In response to receiving the transaction confirmation, user 101 may interact with user device 110 and/or merchant device 125 to generate a second air sign input. User 101 may generate the second air sign input using user device 110 and/or merchant device 125 such as, for example, similar to the generation of the (first) air sign input in steps 604, 606-1, and 606-2. The second air sign input may be generated as a response to the second air sign prompt and/or the confirmation air sign prompt from the transaction confirmation. User device 110 or merchant device 125 may transmit an air sign confirmation comprising the second air sign input to air sign server 130.

Air sign server 130 receives the air sign confirmation (step 618) from user device 110 or merchant device 125. Air sign server 130 may preprocess the second air sign input (e.g., similar to step 610), determine a stored air sign symbol based on the second air sign input (e.g., similar to step 612), and query merchant database 335 to retrieve the merchant data based on the determined stored air sign symbol (e.g., similar to step 614). In response to the second air sign input being generated in response to the second air sign prompt, air sign server 130 may generate a second transaction confirmation (e.g., similar to step 616). The second transaction confirmation the confirmation air sign prompt, or a third air sign prompt. In response to the second air sign input being generated in response to the confirmation air sign prompt, air sign server 130 transmits a transaction authorization request to payment network 180 (step 620). The transaction authorization request may comprise the user identifier, the merchant identifier, and the transaction cost.

In response to receiving the transaction authorization request, payment network 180 processes the transaction authorization request (step 622). Payment network 180 may process, authorize, and settle the transaction authorization request using any suitable method. Payment network 180 transmits a transaction authorization confirmation to air sign server 130 (step 624) in response to successfully authorizing the transaction authorization request. In response to receiving the transaction authorization request, air sign server 130 communicates a transaction approval communication to user 101 (step 626). For example, air sign server 130 may transmit the transaction approval to user device 110. The transaction approval communication may be transmitted as a visual notification to transaction account UI 115; as a push notification, email, SMS, MMS, or the like transmitted to user device 110; and/or any other suitable notification method. In various embodiments, the transaction approval communication may also be transmitted to merchant device 125, and displayed to user 101 via communications interface 228. In response to receiving the transaction approval communication, user 101 and merchant 103 may proceed with the completing the motion-enabled transaction.

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized, and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. Furthermore, any reference to singular includes plural embodiments, and any reference to more than one component may include a singular embodiment. Although specific advantages have been enumerated herein, various embodiments may include some, none, or all of the enumerated advantages.

Systems, methods, and computer program products are provided. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "transmit" may include sending at least a portion of electronic data from one system 100 component to another. Additionally, as used herein, "data," "information," or the like may include encompassing information such as commands, queries, files, messages, data for storage, and the like in digital or any other form.

As used herein, "electronic communication" may comprise a physical coupling and/or non-physical coupling capable of enabling system 100 components to transmit and receive data. For example, "electronic communication" may refer to a wired or wireless protocol such as a CAN bus protocol, an Ethernet physical layer protocol (e.g., those using 10 BASE-T, 100 BASE-T, 1000 BASE-T, etc.), an IEEE 1394 interface (e.g., FireWire), Integrated Services for Digital Network (ISDN), a digital subscriber line (DSL), an 802.11a/b/g/n/ac signal (e.g., Wi-Fi), a wireless communications protocol using short wavelength UHF radio waves and defined at least in part by IEEE 802.15.1 (e.g., the BLUETOOTH® protocol maintained by Bluetooth Special Interest Group), a wireless communications protocol defined at least in part by IEEE 802.15.4 (e.g., the ZIGBEE® protocol maintained by the ZigBee alliance), a cellular protocol, an infrared protocol, an optical protocol, or any other protocol capable of transmitting information via a wired or wireless connection.

One or more of the system 100 components may be in electronic communication via a network. As used herein, the term "network" may further include any cloud, cloud computing system, or electronic communications system or method that incorporates hardware and/or software components. Communication amongst the nodes may be accomplished through any suitable communication channels such as, for example, a telephone network, an extranet, an intranet, Internet, point of interaction device (personal digital assistant, cellular phone, kiosk, tablet, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using Internetwork Packet Exchange (IPX), APPLETALK® program, IP-6, NetBIOS, OSI, any tunneling protocol (e.g. IPsec, SSH, etc.), or any number of existing or future protocols. If the network is in the nature of a public network, such as the internet, it may be advantageous to presume the network to be insecure and open to eavesdroppers. Specific information related to the protocols, standards, and application software utilized in connection with the Internet is generally known to those skilled in the art and, as such, need not be detailed herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing.

The various system components may be independently, separately or collectively suitably coupled to the network via data links which includes, for example, a connection to an Internet Service Provider (ISP) over the local loop as is typically used in connection with standard modem communication, cable modem, DISH NETWORKS®, ISDN, DSL, or various wireless communication methods. It is noted that the network may be implemented as other types of networks, such as an interactive television (ITV) network. Moreover, the system contemplates the use, sale or distribution of any goods, services or information over any network having similar functionality described herein.

A network may be unsecure. Thus, communication over the network may utilize data encryption. Encryption may be performed by way of any of the techniques now available in the art or which may become available—e.g., Twofish, RSA, El Gamal, Schorr signature, DSA, PGP, PKI, GPG (GnuPG), HPE Format-Preserving Encryption (FPE), Voltage, Triple DES, Blowfish, AES, MD5, HMAC, IDEA, RC6, and symmetric and asymmetric cryptosystems. Network communications may also incorporate SHA series cryptographic methods, elliptic-curve cryptography (e.g., ECC, ECDH, ECDSA, etc.), and/or other post-quantum cryptography algorithms under development.

For the sake of brevity, conventional data networking, application development, and other functional aspects of system 100 may not be described in detail herein. Furthermore, the connecting lines shown in the various figures contained herein are intended to represent exemplary functional relationships and/or electronic communications between the various elements. It should be noted that many alternative or additional functional relationships or electronic communications may be present in a practical system.

In various embodiments, user device 110 and/or merchant device 125 may also comprise a biometric security system that may be used for providing biometrics as a primary or secondary form of identification. The biometric security system may include a transponder and a reader communicating with user device 110 and/or merchant device 125. The biometric security system also may include a biometric sensor that detects biometric samples and a device for verifying biometric samples. The biometric security system may be configured with one or more biometric scanners, processors and/or systems. A biometric system may include one or more technologies, or any portion thereof. As used herein, a biometric may include a user's voice, fingerprint, facial, ear, signature, vascular patterns, DNA sampling, hand geometry, sound, olfactory, keystroke/typing, iris, retinal, or any other biometric relating to recognition based upon any body part, function, system, attribute and/or other characteristic, or any portion thereof.

In various embodiments, the system and various components (e.g., user device 110, merchant device 125, etc.) may integrate with one or more smart digital assistant technologies. For example, exemplary smart digital assistant technologies may include the ALEXA® system developed by the AMAZON® company, the GOOGLE HOME® system developed by Alphabet, Inc., the HOMEPOD® system of the APPLE® company, and/or similar digital assistant technologies. The ALEXA® system, GOOGLE HOME® system, and HOMEPOD® system, may each provide cloud-based voice activation services that can assist with tasks, entertainment, general information, and more. All the ALEXA® devices, such as the AMAZON ECHO®, AMAZON ECHO DOT®, AMAZON TAP®, and AMAZON FIRE® TV, have access to the ALEXA® system. The ALEXA® system, GOOGLE HOME® system, and HOMEPOD® system may receive voice commands via its voice activation technology, activate other functions, control smart devices, and/or gather information. For example, the smart digital assistant technologies may be used to interact with music, emails, texts, phone calls, question answering, home improvement information, smart home communication/activation, games, shopping, making to-do lists, setting alarms, streaming podcasts, playing audiobooks, and providing weather, traffic, and other real time information, such as news. The ALEXA®, GOOGLE HOME®, and HOME-POD® systems may also allow the user to access information about eligible transaction accounts linked to an online account across all digital assistant-enabled devices. As a further example, the smart digital assistant technologies may be used by user 101 and/or merchant 103 to initiate and complete motion-enabled transactions, as discussed further herein.

As used herein, "satisfy," "meet," "match," "associated with", or similar phrases may include an identical match, a partial match, meeting certain criteria, matching a subset of data, a correlation, satisfying certain criteria, a correspondence, an association, an algorithmic relationship, and/or the like. Similarly, as used herein, "authenticate" or similar terms may include an exact authentication, a partial authentication, authenticating a subset of data, a correspondence, satisfying certain criteria, an association, an algorithmic relationship, and/or the like.

Terms and phrases similar to "associate" and/or "associating" may include tagging, flagging, correlating, using a look-up table or any other method or system for indicating or creating a relationship between elements such as, for example, (i) a transaction account and (ii) an item (e.g., offer, reward, discount, etc.) and/or digital channel. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input, and/or any other method known in the art.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, UNIX®, LINUX®, SOLARIS®, MACOS®, etc.) as well as various conventional support software and drivers typically associated with computers.

The present system, or any part(s) or function(s) thereof, may be implemented using hardware, software, or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations or any of the operations may be conducted or enhanced by artificial intelligence (AI) or machine learning. Artificial intelligence may refer generally to the study of agents (e.g., machines, computer-based systems, etc.) that perceive the world around them, form plans, and make decisions to achieve their goals. Foundations of AI include mathematics, logic, philosophy, probability, linguistics, neuroscience, and decision theory. Many fields fall under the umbrella of AI, such as computer vision, robotics, machine learning, and natural language processing. Useful machines for performing the various embodiments include general purpose digital computers or similar devices.

The computer system may also include a communications interface. A communications interface allows software and data to be transferred between the computer system and external devices. Examples of communications interface may include a modem, a network interface (such as an Ethernet card), a communications port, etc. Software and data transferred via the communications interface are in the form of signals which may be electronic, electromagnetic, optical, or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

Any communication, transmission, communications channel, channel, and/or the like discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website, mobile application, or device (e.g., FACEBOOK®, YOU-TUBE®, PANDORA®, APPLE TV®, MICROSOFT® XBOX®, ROKU®, AMAZON FIRE®, GOOGLE CHROMECAST™, SONY® PLAYSTATION®, NINTENDO® SWITCH®, etc.) a uniform resource locator ("URL"), a document (e.g., a MICROSOFT® Word™ or EXCEL®, an ADOBE® Portable Document Format (PDF) document, etc.), an "ebook," an "emagazine," an application or microapplication (as described herein), an SMS or other type of text message, an email, a FACEBOOK® message, a TWITTER® tweet, multimedia messaging services (MMS), and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network, and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, LINKEDIN®, INSTAGRAM®, PINTEREST®, TUMBLR®, REDDIT®, SNAPCHAT®, WHATSAPP®, FLICKR®, VK®, QZONE®, WECHAT®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

Further, illustrations of the process flows and the descriptions thereof may make reference to user WINDOWS® applications, webpages, websites, web forms, prompts, etc. Practitioners will appreciate that the illustrated steps described herein may comprise in any number of configurations including the use of WINDOWS® applications, webpages, web forms, popup WINDOWS® applications, prompts, and the like. It should be further appreciated that the multiple steps as illustrated and described may be combined into single webpages and/or WINDOWS® applications but have been expanded for the sake of simplicity. In other cases, steps illustrated and described as single process steps may be separated into multiple webpages and/or WINDOWS® applications but have been combined for simplicity.

In various embodiments, components, modules, and/or engines of system 100 may be implemented as micro-applications or micro-apps. Micro-apps are typically deployed in the context of a mobile operating system, including for example, a WINDOWS® mobile operating system, an ANDROID® operating system, an APPLE® iOS operating system, a BLACKBERRY® company's operating system, and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

In various embodiments, the system may implement middleware to provide software applications and services, and/or to bridge software components in the computer-based system, such as the operating system, database, applications, and the like. Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the internet server. Middleware may be configured to process transactions between the various components of an application server and any number of internal or external systems for any of the purposes disclosed herein. WEBSPHERE® MQTM (formerly MQSeries) by IBM®, Inc. (Armonk, N.Y.) is an example of a commercially available middleware product. An Enterprise Service Bus ("ESB") application is another example of middleware.

The systems, computers, computer-based systems, and the like disclosed herein may provide a suitable website or other internet-based graphical user interface which is accessible by users. Practitioners will appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT® programs, active server pages (ASP), common gateway interface scripts (CGI), extensible markup language (XML), dynamic HTML, cascading style sheets (CSS), AJAX (Asynchronous JAVASCRIPT and XML) programs, helper applications, plug-ins, and the like. A server may include a web service that receives a request from a web server, the request including a URL and an IP address (192.168.1.1). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art and are covered in many standard texts. As a further example, representational state transfer (REST), or RESTful, web services may provide one way of enabling interoperability between applications.

In one embodiment, MICROSOFT® company's Internet Information Services (IIS), Transaction Server (MTS) service, and an SQL SERVER® database, are used in conjunction with MICROSOFT® operating systems, WINDOWS NT® web server software, SQL SERVER® database, and MICROSOFT® Commerce Server. Additionally, components such as ACCESS® software, SQL SERVER® database, ORACLE® software, SYBASE® software, INFORMIX® software, MYSQL® software, INTERBASE® software, etc., may be used to provide an Active Data Object (ADO) compliant database management system. In one embodiment, the APACHE® web server is used in conjunction with a LINUX® operating system, a MYSQL® database, and PERL®, PHP, Ruby, and/or PYTHON® programming languages.

In various embodiments, the server may include application servers (e.g. WEBSPHERE®, WEBLOGIC®, JBOSS®, POSTGRES PLUS ADVANCED SERVER®, etc.). In various embodiments, the server may include web servers (e.g. Apache, IIS, GOOGLE® Web Server, SUN JAVA® System Web Server, JAVA® Virtual Machine running on LINUX® or WINDOWS® operating systems).

Users, systems, computer-based systems or the like may communicate with the server via a web client. The web client includes any device or software which communicates via any network such as, for example any device or software discussed herein. The web client may include internet browsing software installed within a computing unit or system to conduct online transactions and/or communications. These computing units or systems may take the form of a computer or set of computers, although other types of computing units or systems may be used, including personal computers, laptops, notebooks, tablets, smart phones, cellular phones, personal digital assistants, servers, pooled servers, mainframe computers, distributed computing clusters, kiosks, terminals, point of sale (POS) devices or terminals, televisions, or any other device capable of receiving data over a network. The web client may include an operating system (e.g., WINDOWS®, WINDOWS MOBILE® operating systems, UNIX® operating system, LINUX® operating systems, APPLE® OS® operating systems, etc.) as well as various conventional support software and drivers typically associated with computers. The web-client may also run MICROSOFT® INTERNET EXPLORER® software, MOZILLA® FIREFOX® software, GOOGLE®

CHROME® software, APPLE® SAFARI® software, or any other of the myriad software packages available for browsing the internet.

As those skilled in the art will appreciate, the web client may or may not be in direct contact with the server (e.g., application server, web server, etc., as discussed herein). For example, the web client may access the services of the server through another server and/or hardware component, which may have a direct or indirect connection to an internet server. For example, the web client may communicate with the server via a load balancer. In various embodiments, web client access is through a network or the internet through a commercially-available web-browser software package. In that regard, the web client may be in a home or business environment with access to the network or the internet. The web client may implement security protocols such as Secure Sockets Layer (SSL) and Transport Layer Security (TLS). A web client may implement several application layer protocols including HTTP, HTTPS, FTP, and SFTP.

Any databases discussed herein may include relational, hierarchical, graphical, blockchain, object-oriented structure, and/or any other database configurations. Any database may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2® by IBM® (Armonk, N.Y.), various database products available from ORACLE® Corporation (Redwood Shores, Calif.), MICROSOFT ACCESS® or MICROSOFT SQL SERVER® by MICROSOFT® Corporation (Redmond, Wash.), MYSQL® by MySQL AB (Uppsala, Sweden), MONGODB®, Redis, Apache Cassandra®, HBASE® by APACHE®, MapR-DB by the MAPR® corporation, or any other suitable database product. Moreover, any database may be organized in any suitable manner, for example, as data tables or lookup tables. Each record may be a single file, a series of files, a linked series of data fields, or any other data structure.

Any database discussed herein may comprise a distributed ledger maintained by a plurality of computing devices (e.g., nodes) over a peer-to-peer network. Each computing device maintains a copy and/or partial copy of the distributed ledger and communicates with one or more other computing devices in the network to validate and write data to the distributed ledger. The distributed ledger may use features and functionality of blockchain technology, including, for example, consensus-based validation, immutability, and cryptographically chained blocks of data. The blockchain may comprise a ledger of interconnected blocks containing data. The blockchain may provide enhanced security because each block may hold individual transactions and the results of any blockchain executables. Each block may link to the previous block and may include a timestamp. Blocks may be linked because each block may include the hash of the prior block in the blockchain. The linked blocks form a chain, with only one successor block allowed to link to one other predecessor block for a single chain. Forks may be possible where divergent chains are established from a previously uniform blockchain, though typically only one of the divergent chains will be maintained as the consensus chain. In various embodiments, the blockchain may implement smart contracts that enforce data workflows in a decentralized manner. The system may also include applications deployed on user devices such as, for example, computers, tablets, smartphones, Internet of Things devices ("IoT" devices), etc. The applications may communicate with the blockchain (e.g., directly or via a blockchain node) to transmit and retrieve data. In various embodiments, a governing organization or consortium may control access to data stored on the blockchain. Registration with the managing organization(s) may enable participation in the blockchain network.

Data transfers performed through the blockchain-based system may propagate to the connected peers within the blockchain network within a duration that may be determined by the block creation time of the specific blockchain technology implemented. For example, on an ETHEREUM®-based network, a new data entry may become available within about 13-20 seconds as of the writing. On a HYPERLEDGER® Fabric 1.0 based platform, the duration is driven by the specific consensus algorithm that is chosen and may be performed within seconds. In that respect, propagation times in the system may be improved compared to existing systems, and implementation costs and time to market may also be drastically reduced. The system also offers increased security at least partially due to the immutable nature of data that is stored in the blockchain, reducing the probability of tampering with various data inputs and outputs. Moreover, the system may also offer increased security of data by performing cryptographic processes on the data prior to storing the data on the blockchain. Therefore, by transmitting, storing, and accessing data using the system described herein, the security of the data is improved, which decreases the risk of the computer or network from being compromised.

In various embodiments, the system may also reduce database synchronization errors by providing a common data structure, thus at least partially improving the integrity of stored data. The system also offers increased reliability and fault tolerance over traditional databases (e.g., relational databases, distributed databases, etc.) as each node operates with a full copy of the stored data, thus at least partially reducing downtime due to localized network outages and hardware failures. The system may also increase the reliability of data transfers in a network environment having reliable and unreliable peers, as each node broadcasts messages to all connected peers, and, as each block comprises a link to a previous block, a node may quickly detect a missing block and propagate a request for the missing block to the other nodes in the blockchain network. For more information on distributed ledgers implementing features and functionalities of blockchain, see U.S. application Ser. No. 15/266,350 titled SYSTEMS AND METHODS FOR BLOCKCHAIN BASED PAYMENT NETWORKS and filed on Sep. 15, 2016, U.S. application Ser. No. 15/682,180 titled SYSTEMS AND METHODS FOR DATA FILE TRANSFER BALANCING AND CONTROL ON BLOCKCHAIN and filed Aug. 21, 2017, U.S. application Ser. No. 15/728,086 titled SYSTEMS AND METHODS FOR LOYALTY POINT DISTRIBUTION and filed Oct. 9, 2017, U.S. application Ser. No. 15/785,843 titled MESSAGING BALANCING AND CONTROL ON BLOCKCHAIN and filed on Oct. 17, 2017, U.S. application Ser. No. 15/785,870 titled API REQUEST AND RESPONSE BALANCING AND CONTROL ON BLOCKCHAIN and filed on Oct. 17, 2017, U.S. application Ser. No. 15/824,450 titled SINGLE SIGN-ON SOLUTION USING BLOCKCHAIN and filed on Nov. 28, 2017, U.S. application Ser. No. 15/824,513 titled TRANSACTION AUTHORIZATION PROCESS USING BLOCKCHAIN and filed on Nov. 28, 2017, U.S. application Ser. No. 15/943,168 titled TRANSACTION PROCESS USING BLOCKCHAIN TOKEN SMART CONTRACTS and filed on Apr. 2, 2018, U.S. application Ser. No. 15/943,271 titled FRAUD MANAGEMENT USING A DISTRIBUTED DATABASE and filed on Apr. 2, 2018, U.S. application Ser. No. 16/012,598 titled BUYER-CENTRIC MARKETPLACE USING BLOCKCHAIN and filed on Jun. 19, 2018, U.S. Application Ser. No. 16/051,126 titled System and Method for Transaction Account Based Micro-Payments and filed on Jul. 31, 2018, and U.S. application Ser. No. 16/052,416 titled PROCUREMENT SYSTEM USING BLOCKCHAIN and filed on Aug. 1, 2018, the contents of which are each incorporated by reference in its entirety.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce in/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); data stored as Binary Large Object (BLOB); data stored as ungrouped data elements encoded using ISO/IEC 7816-6 data elements; data stored as ungrouped data elements encoded using ISO/IEC Abstract Syntax Notation (ASN.1) as in ISO/IEC 8824 and 8825; other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with system. The BLOB method may store data sets as ungrouped data elements formatted as a block of binary via a fixed memory offset using either fixed storage allocation, circular queue techniques, or best practices with respect to memory management (e.g., paged memory, least recently used, etc.).

By using BLOB methods, the ability to store various data sets that have different formats facilitates the storage of data, in the database or associated with the system, by multiple and unrelated owners of the data sets. For example, a first data set which may be stored may be provided by a first party, a second data set which may be stored may be provided by an unrelated second party, and yet a third data set which may be stored, may be provided by a third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header," "header," "trailer," or "status," herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user, or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer, may be received by a standalone interaction device configured to add, delete, modify, or augment the data in accordance with the header or trailer. As such, in one embodiment, the header or trailer is not stored on the transaction device along with the associated issuer-owned data but instead the appropriate action may be taken by providing to the user at the standalone device, the appropriate option for the action to be taken. The system may contemplate a data storage arrangement wherein the header or trailer, or header or trailer history, of the data is stored on the system, device or transaction instrument in relation to the appropriate data.

One skilled in the art will also appreciate that, for security reasons, any databases, systems, devices, servers, or other components of the system may consist of any combination thereof at a single location or at multiple locations, wherein each database, system, device, server, and/or other component includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, GPG (GnuPG), HPE Format-Preserving Encryption (FPE), Voltage, Triple DES, Blowfish, AES, MD5, HMAC, IDEA, RC6, and symmetric and asymmetric cryptosystems. The systems and methods may also incorporate SHA series cryptographic methods, elliptic-curve cryptography (e.g., ECC, ECDH, ECDSA, etc.), and/or other post-quantum cryptography algorithms under development.

A firewall may include any hardware and/or software suitably configured to protect CMS components and/or enterprise computing resources from users of other networks. Further, the firewall may be configured to limit or restrict access to various systems and components behind the firewall for web clients connecting through a web server. The firewall may reside in varying configurations including Stateful Inspection, Proxy based, access control lists, and Packet Filtering among others. The firewall may be integrated within a web server or any other CMS components or may further reside as a separate entity. The firewall may implement network address translation ("NAT") and/or network address port translation ("NAPT"). The firewall may accommodate various tunneling protocols to facilitate secure communications, such as those used in virtual private networking. The firewall may implement a demilitarized zone ("DMZ") to facilitate communications with a public network such as the internet. The firewall may be integrated as software within an internet server, any other application server components or may reside within another computing device or may take the form of a standalone hardware component.

The system and method may be described herein in terms of functional block components, screen shots, optional selections, and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT®, JAVASCRIPT® Object Notation (JSON), VBScript, Macromedia COLD FUSION, COBOL, MICROSOFT® company's Active Server Pages, assembly, PERL®, PHP, ask, PYTHON®, Visual Basic, SQL Stored Procedures, PL/SQL, any UNIX® shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT®, VBScript, or the like. Cryptography and network security methods are well known in the art and are covered in many standard texts.

In various embodiments, the software elements of the system may also be implemented using NODE.JS® components. NODE.JS® programs may implement several modules to handle various core functionalities. For example, a package management module, such as NPM®, may be implemented as an open source library to aid in organizing the installation and management of third-party NODE.JS® programs. NODE.JS® programs may also implement a process manager such as, for example, Parallel Multi-threaded Machine ("PM2"); a resource and performance monitoring tool such as, for example, Node Application Metrics ("appmetrics"); a library module for building user interfaces, and/or any other suitable and/or desired module.

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet-based embodiment, an entirely hardware embodiment, or an embodiment combining aspects of the internet, software, and hardware. Furthermore, the system may take the form of a computer program product on a computer-readable storage medium having computer-readable program code means embodied in the storage medium. Any suitable computer-readable storage medium may be utilized, including hard disks, CD-ROM, SONY BLU-RAY DISC®, optical storage devices, magnetic storage devices, and/or the like.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Although the disclosure includes a method, it is contemplated that it may be embodied as computer program instructions on a tangible computer-readable carrier, such as a magnetic or optical memory or a magnetic or optical disk. All structural, mechanical, electrical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. § 112(f) unless the element is expressly recited using the phrase "means for" or "step for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A computer-implemented method, comprising:
    detecting, via data generated by a motion detector, a motion-enabled transaction request from a user computing device based at least in part on a motion of the user computing device, the motion simulating an air sign symbol;
    determining a stored air sign symbol corresponding to the air sign symbol simulated by the motion;
    retrieving at least one of a merchant identifier, a transaction type, or a transaction cost based at least in part on the stored air sign symbol; and
    transmitting to the user computing device a transaction confirmation comprising the at least one of the merchant identifier, the transaction type, or the transaction cost in response to the determined stored air sign symbol.

2. The computer-implemented method of claim 1, wherein transmitting to the user computing device the transaction confirmation further comprises transmitting to the user computing device the transaction confirmation via near-field communication (NFC).

3. The computer-implemented method of claim 1, wherein the motion detector comprises a camera in the user computing device.

4. The computer-implemented method of claim 1, wherein the motion detector comprises a camera external to the user computing device.

5. The computer-implemented method of claim 1, wherein the motion detector comprises an accelerometer in the user computing device.

6. The computer-implemented method of claim 1, further comprising:
    determining a location of the user computing device reported by a global positioning system (GPS) in the user computing device; and
    retrieving the at least one of the merchant identifier, the transaction type, or the transaction cost further based at least in part on the location.

7. The computer-implemented method of claim 1, wherein determining the stored air sign symbol corresponding to the air sign symbol simulated by the motion further comprises inputting data corresponding to the motion into a trained neural network.

8. The computer-implemented method of claim 1, further comprising preprocessing the data generated by the motion detector and corresponding to the motion by at least one of filtering or normalizing the data.

9. The computer-implemented method of claim 8, wherein normalizing the data further comprises converting three-axis data to two-axis data by calculating an angle of the motion and normalizing the data to a two-dimensional plane.

10. The computer-implemented method of claim 8, wherein filtering the data further comprises removing redundant data points from the data corresponding to the motion.

11. The computer-implemented method of claim 1, further comprising:
    transmitting a transaction authorization request to a payment network, the transaction authorization request comprising a user identifier and the transaction cost; and
    receiving a transaction authorization from the payment network in response to the transaction authorization request, the transaction confirmation being sent to the user computing device in response to receiving the transaction authorization.

12. A computer system, comprising:
    a processor;
    a memory; and
    instructions stored in the memory that, when executed by the processor, cause the computer system to at least:
        detect a motion-enabled transaction request from a user computing device based at least in part on a motion simulating an air sign symbol;
        determine a stored air sign symbol corresponding to the air sign symbol simulated by the motion;
        determine a location of the user computing device reported by a global positioning system (GPS) in the user computing device;
        retrieve at least one of a merchant identifier, a transaction type, or a transaction cost based at least in part on the stored air sign symbol and the location; and
        transmit to the user computing device a transaction confirmation comprising the at least one of the merchant identifier, the transaction type, or the transaction cost in response to the determined stored air sign symbol and the determined location.

13. The computer system of claim 12, wherein the motion corresponds to a motion of the user computing device.

14. The computer system of claim 12, wherein the instructions further cause the computer system to at least input data corresponding to the motion into a trained neural network in order to determine the stored air sign symbol.

15. The computer system of claim 12, wherein the instructions further cause the computer system to at least preprocess data corresponding to the motion by filtering the data corresponding to the motion.

16. The computer system of claim 12, wherein the instructions further cause the computer system to at least preprocess data corresponding to the motion by normalizing the data corresponding to the motion.

17. The computer system of claim 12, wherein the instructions further cause the computer system to at least:
    transmit a transaction authorization request to a payment network, the transaction authorization request comprising a user identifier and the transaction cost; and
    receive a transaction authorization from the payment network in response to the transaction authorization request, the transaction confirmation being sent to the user computing device in response to receipt of the transaction authorization.

18. A non-transitory computer-readable medium storing instructions that, when executed, cause a computer system to at least:

detect a motion-enabled transaction request from a user computing device based at least in part on a motion simulating an air sign symbol;

determine a stored air sign symbol corresponding to the air sign symbol simulated by the motion;

retrieve at least one of a merchant identifier, a transaction type, or a transaction cost based at least in part on the stored air sign symbol and location coordinates of the user computing device; and transmit to the user computing device a transaction confirmation comprising the at least one of the merchant identifier, the transaction type, or the transaction cost in response to the determined stored air sign symbol and the location coordinates.

19. The non-transitory computer-readable medium of claim 18, wherein the instructions further cause the computer system to at least receive the location coordinates reported by a global positioning system (GPS) of the user computing device.

20. The non-transitory computer-readable medium of claim 18, wherein the motion is detected using a touchscreen interface.

* * * * *